US00RE46146E

(19) United States
(12) Reissued Patent
Park et al.

(10) Patent Number: US RE46,146 E
(45) Date of Reissued Patent: Sep. 13, 2016

(54) LIQUID CRYSTAL DISPLAY DEVICE AND METHOD OF MANUFACTURING THE SAME

(71) Applicant: LG DISPLAY CO., LTD., Seoul (KR)

(72) Inventors: Moo Yeol Park, Taegu-Kwangyokshi (KR); Sung Su Jung, Taegu-Kwangyokshi (KR); Young Sang Byun, Kumi-shi (KR)

(73) Assignee: LG DISPLAY CO., LTD, Seoul (KR)

(21) Appl. No.: 13/960,713

(22) Filed: Aug. 6, 2013

Related U.S. Patent Documents

Reissue of:
(64) Patent No.: 7,218,374
Issued: May 15, 2007
Appl. No.: 10/184,118
Filed: Jun. 28, 2002

(30) Foreign Application Priority Data

Feb. 20, 2002 (KR) ..... 2002-8900

(51) Int. Cl.
*G02F 1/1339* (2006.01)

(52) U.S. Cl.
CPC ..... *G02F 1/1339* (2013.01)

(58) Field of Classification Search
CPC ..... G02F 1/1339
USPC ..... 349/190, 187, 189
See application file for complete search history.

(56) References Cited

U.S. PATENT DOCUMENTS 3,978,580 A 9/1976 Leupp et al.
4,094,058 A 6/1978 Yasutake et al.
4,653,864 A 3/1987 Baron et al.
4,691,995 A 9/1987 Yamazaki et al.
4,775,225 A 10/1988 Tsuboyama et al.
5,089,358 A * 2/1992 Taki et al. ..... 428/694 DE
5,247,377 A 9/1993 Omeis et al.
5,263,888 A 11/1993 Ishihara et al.
5,307,190 A * 4/1994 Wakita et al. ..... 349/158
5,379,139 A 1/1995 Sato et al.
5,406,989 A 4/1995 Abe
5,410,423 A * 4/1995 Furushima et al. ..... 349/190
5,499,128 A 3/1996 Hasegawa et al.
5,507,323 A 4/1996 Abe
5,511,591 A 4/1996 Abe
5,517,344 A * 5/1996 Hu et al. ..... 349/153

(Continued)

FOREIGN PATENT DOCUMENTS

EP 1 003 066 A1 5/2000
EP 1003066 A1 5/2000

(Continued)

*Primary Examiner* — Deandra Hughes
(74) *Attorney, Agent, or Firm* — Morgan, Lewis & Bockius LLP

(57) ABSTRACT

An LCD device and a method of manufacturing the same are disclosed, in which a sealant concentrated upon the end of a dispensing device is formed in a dummy region on a substrate, so that a liquid crystal layer is not contaminated when both substrates are attached to each other and a cell cutting process can easily be performed. The method of manufacturing an LCD device includes preparing a lower substrate and an upper substrate, forming an auxiliary UV sealant in a dummy region on one of the lower and upper substrate and forming a main UV sealant, applying a liquid crystal on one of the lower and upper substrates, attaching the lower and upper substrates, and irradiating UV light onto the attached substrates.

28 Claims, 9 Drawing Sheets

(56) References Cited

U.S. PATENT DOCUMENTS

| | | | | | |
|---|---|---|---|---|---|
| 5,539,545 | A | | 7/1996 | Shimizu et al. | |
| 5,548,429 | A | | 8/1996 | Tsujita | |
| 5,642,214 | A | | 6/1997 | Ishii et al. | |
| 5,677,749 | A | * | 10/1997 | Tsubota et al. | 349/160 |
| 5,680,189 | A | | 10/1997 | Shimizu et al. | |
| 5,724,110 | A | * | 3/1998 | Majima | 349/86 |
| 5,742,370 | A | | 4/1998 | Kim et al. | |
| 5,757,451 | A | | 5/1998 | Miyazaki et al. | |
| 5,771,084 | A | * | 6/1998 | Fujimori et al. | 349/153 |
| 5,852,484 | A | | 12/1998 | Inoue et al. | |
| 5,854,664 | A | | 12/1998 | Inoue et al. | |
| 5,861,932 | A | | 1/1999 | Inata et al. | |
| 5,875,922 | A | | 3/1999 | Chastine et al. | |
| 5,898,041 | A | | 4/1999 | Yamada et al. | |
| 5,946,070 | A | * | 8/1999 | Kohama et al. | 349/156 |
| 5,952,676 | A | | 9/1999 | Sato | |
| 5,952,678 | A | | 9/1999 | Ashida | |
| 5,956,112 | A | | 9/1999 | Fujimori et al. | |
| 6,001,203 | A | | 12/1999 | Yamada et al. | |
| 6,011,609 | A | | 1/2000 | Kato et al. | |
| 6,016,178 | A | | 1/2000 | Kataoka et al. | |
| 6,016,181 | A | | 1/2000 | Shimada | |
| 6,055,035 | A | | 4/2000 | von Gutfeld et al. | |
| 6,137,559 | A | * | 10/2000 | Tanaka et al. | 349/153 |
| 6,163,357 | A | | 12/2000 | Nakamura | |
| 6,177,976 | B1 | * | 1/2001 | Murai et al. | 349/191 |
| 6,219,126 | B1 | * | 4/2001 | Von Gutfeld | 349/153 |
| 6,222,603 | B1 | * | 4/2001 | Sakai et al. | 349/153 |
| 6,226,067 | B1 | | 5/2001 | Nishiguchi et al. | |
| 6,236,445 | B1 | | 5/2001 | Foschaar et al. | |
| 6,239,855 | B1 | * | 5/2001 | Nakahara et al. | 349/153 |
| 6,304,306 | B1 | | 10/2001 | Shiomi et al. | |
| 6,304,311 | B1 | * | 10/2001 | Egami et al. | 349/189 |
| 6,337,730 | B1 | | 1/2002 | Ozaki et al. | |
| 6,373,544 | B1 | * | 4/2002 | Hirabayashi | 349/149 |
| 6,414,733 | B1 | | 7/2002 | Ishikawa et al. | |
| 6,473,148 | B1 | * | 10/2002 | Suh | 349/153 |
| 6,542,215 | B2 | * | 4/2003 | Lee et al. | 349/153 |
| 6,573,968 | B2 | * | 6/2003 | Jeong | 349/153 |
| 6,628,365 | B1 | * | 9/2003 | Park et al. | 349/153 |
| 6,778,249 | B1 | * | 8/2004 | Kamosawa et al. | 349/153 |
| 6,844,910 | B2 | * | 1/2005 | Katsura | 349/189 |
| 7,199,855 | B2 | * | 4/2007 | Yoshimi et al. | 349/187 |
| 7,218,374 | B2 | * | 5/2007 | Park et al. | 349/190 |
| 7,230,669 | B1 | * | 6/2007 | Tashiro et al. | 349/153 |
| 7,362,409 | B2 | * | 4/2008 | Tamatani et al. | 349/189 |
| 2001/0021000 | A1 | | 9/2001 | Egami | |
| 2001/0026348 | A1 | | 10/2001 | Murata et al. | |

FOREIGN PATENT DOCUMENTS

| | | |
|---|---|---|
| JP | 51-065656 | 6/1976 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | 60164723 | 8/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 9-15614 | 1/1997 |
| JP | 09-026578 | 1/1997 |
| JP | H09-001026 | 1/1997 |
| JP | 09-311340 | 2/1997 |
| JP | 09-061829 | 3/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 9197416 | 7/1997 |
| JP | 09-230357 | 9/1997 |
| JP | 09-281511 | 10/1997 |
| JP | 09311340 | 12/1997 |
| JP | 10-123537 | 5/1998 |
| JP | 10-123538 | 5/1998 |
| JP | 10-142616 | 5/1998 |
| JP | 10123538 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 3000-147528 | 5/2000 |
| JP | 2000-137235 | 6/2000 |

(56) References Cited

FOREIGN PATENT DOCUMENTS

| | | |
|---|---|---|
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 201183675 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-215459 | 9/2001 |
| JP | 2001-255542 | 9/2001 |
| JP | 2001-264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-014360 | 1/2002 |
| JP | 2002-023176 | 1/2002 |
| JP | 2002-049045 | 2/2002 |
| JP | 2002-079160 | 3/2002 |
| JP | 2002-080321 | 3/2002 |
| JP | 2002-082340 | 3/2002 |
| JP | 2002-090759 | 3/2002 |
| JP | 2002-090760 | 3/2002 |
| JP | 2002-107740 | 4/2002 |
| JP | 2002-122870 | 4/2002 |
| JP | 2002-122872 | 4/2002 |
| JP | 2002-122873 | 4/2002 |
| JP | 2002-131762 | 5/2002 |
| JP | 2002-139734 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002080321 | 6/2002 |
| JP | 2002-202512 | 7/2002 |
| JP | 2002-202514 | 7/2002 |
| JP | 2002-214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| JP | 2003222883 | 8/2003 |
| KR | 10-0211010 | 7/1996 |
| KR | 10-0232905 | 10/1996 |
| KR | 2000-0035302 | 6/2000 |
| KR | 2000-0035302 A1 | 6/2000 |

* cited by examiner

LIQUID CRYSTAL DISPLAY DEVICE AND METHOD OF MANUFACTURING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of the Korean Application No. P2002-8900 filed on Feb. 20, 2002, which is hereby incorporated by reference for all purposes as if fully set forth herein.

This application incorporates by reference two applications, Ser. No. 10/184,096, filed on Jun. 28, 2002, entitled "SYSTEM AND METHOD FOR MANUFACTURING LIQUID CRYSTAL DISPLAY DEVICES"and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD) device, and more particularly, to a sealant pattern of an LCD device manufactured by applying a liquid crystal to the surface of a substrate.

2. Discussion of the Related Art

Generally, ultra thin flat panel displays have a display screen with a thickness of several centimeters or less. In particular, flat panel LCD devices are widely used in monitors for notebook computers, spacecraft, and aircraft because such LCD devices have low power consumption and are easy to carry.

Such an LCD device includes a lower substrate, an upper substrate, and a liquid crystal layer. A thin film transistor (TFT) and a pixel electrode are formed on the lower substrate. The upper substrate is formed to oppose the lower substrate. A light-shielding layer, a color filter layer, and a common electrode are formed on the upper substrate. The liquid crystal layer is formed between the lower and upper substrates. In operation an electric field is formed between the lower and upper substrates by the pixel electrode and the common electrode so that the electric field "drives" the alignment of molecules in the liquid crystal layer. Light transmittivity is controlled by driving the liquid crystal layer so that a picture image is displayed.

In the aforementioned LCD device, to form the liquid crystal layer between lower and upper substrates, a vacuum injection method based on capillary phenomenon and pressure difference has been conventionally used. However, such a vacuum injection method has a problem in that it takes long time to inject the liquid crystal into a large display panel, thereby reducing manufacturing productivity.

To solve such a problem, a method of applying liquid crystal on the substrate has been developed and is generally described with reference to FIGS. 1A to 1D. Although the drawings illustrate only one unit cell, a plurality of unit cells may be formed depending upon the size of the substrate.

As shown in FIG. 1A, a lower substrate 1 and an upper substrate 3 are prepared. A plurality of gate and data lines (not shown) are formed on the lower substrate 1. The gate lines cross the data lines to define a pixel region. A thin film transistor (not shown) is formed at each crossing point between the gate and data lines. A pixel electrode (not shown) connected with the thin film transistor is formed in the pixel region.

A light-shielding layer (not shown) is formed on the upper substrate 3 to prevent light from leaking out from the gate and data lines and the thin film transistor. Color filter layers of red(R), green(G), and blue(B) are formed on the light-shielding layer, and a common electrode is formed on the color filter layers. An alignment film (not shown) is formed on at least one of the lower substrate 1 and the upper substrate 3 to initially align the liquid crystal molecules.

As shown in FIG. 1B, a sealant 7 is formed on the lower substrate 1 and a liquid crystal 5 is applied thereon, so that a liquid crystal layer is formed. A spacer (not shown) is spread or sprayed onto the upper substrate 3 to maintain a cell gap between the upper and lower substrates.

In the method of manufacturing the LCD device based on the liquid crystal application method, a liquid crystal layer is formed on attached substrates before the sealant 7 is hardened. Therefore, if a thermo-hardening sealant is used as the sealant 7, the liquid crystal heats and expands so that it flows out of the substrate when it is heated. For this reason, a problem arises in that the liquid crystal 5 is contaminated. Therefore, in the method of manufacturing the LCD based on the liquid crystal application method, a sealant that is at least partially curable by ultraviolet (UV) light is used as the sealant 7.

The UV sealant is formed by a screen printing method or a dispensing method. In the screen printing method, since a screen comes into contact with the substrate, the alignment film formed on the substrate may be damaged. Also, if the substrate has a large sized area, loss of the sealant increases. In these respects, the dispensing method is preferably used.

As shown in FIG. 1C, the lower substrate 1 is attached to the upper substrate 3.

As shown in FIG. 1D, UV light is irradiated through a UV irradiating device 9 so that the sealant 7 is hardened.

Thereafter, although not shown, a cell cutting process and a final test process are performed, thereby completing a liquid crystal cell.

Meanwhile, FIGS. 2A and 2B are perspective views illustrating a process of forming a UV sealant using a dispensing method. In the method of applying liquid crystal to one of the substrates before attaching the the substrates, since no liquid crystal injection hole is required, a sealant 7 having no injection hole is formed on a lower substrate 1 using a dispensing device 8.

However, since the sealant 7 has high viscosity, it is concentrated upon the end of a nozzle of the dispensing device 8 before the sealant 7 is dispensed. For this reason, a blob "A" of the sealant 7 is excessively deposited at the point where deposition of the sealant 7 on the substrate is started.

As shown in FIG. 2C, the excessively distributed sealant spreads into an active region (central part of the substrate) and a dummy region (outer part of the substrate) when the lower substrate 1 is attached to the upper substrate 3. In this case, a problem arises in that the sealant spreads into the active region and contaminates the liquid crystal while the sealant spread out to the dummy region makes the cell cutting process difficult, especially after the sealant is cured.

SUMMARY OF THE INVENTION

Accordingly, the present invention is directed to an LCD device and a method of manufacturing the same that substantially obviates one or more problems due to limitations and disadvantages of the related art.

An advantage of the present invention is to provide an LCD device and a method of manufacturing the same in which a sealant is formed so that a liquid crystal is not contaminated when both substrates are attached to each other and so that a cell cutting process can be easily performed.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a method of manufacturing an LCD device according to the present invention includes preparing a lower substrate and an upper substrate; forming an auxiliary sealant and subsequently forming a main sealant on one of the lower and upper substrates, wherein the auxiliary sealant is formed in a dummy region and connect to the main sealant; applying a liquid crystal on one of the lower and upper substrates; attaching the lower and upper substrates; and curing at least the main sealant.

In one embodiment of the present invention, the supplementary UV sealant does not perform the ordinary the function of a sealant, that is, it does not prevent the liquid crystal from leaking out. While the main UV sealant acts as a sealant to confine the liquid crystal.

In another aspect of the present invention, a method of manufacturing a liquid crystal display (LCD) device includes preparing a lower substrate and an upper substrate; forming an auxiliary UV sealant and a main UV sealant on one of the lower and upper substrates, wherein the auxiliary UV sealant is formed in a dummy region and extends from the main UV sealant; applying a liquid crystal on one of the lower and upper substrates; attaching the lower and upper substrates; and irradiating UV light on the attached substrates.

In one aspect of the present invention, the supplementary UV sealant is formed in a dummy region on the substrate and then the closed type main UV sealant is formed, so that the sealant concentrated upon the end of a nozzle of a dispensing device is formed in the dummy region on the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

FIGS. 3A to 3D are perspective views illustrating a method of manufacturing an LCD device according to the first embodiment of the present invention;

Although the drawings illustrate only one unit cell, a plurality of unit cells may be formed depending upon the size of the substrate.

Figure 1A:
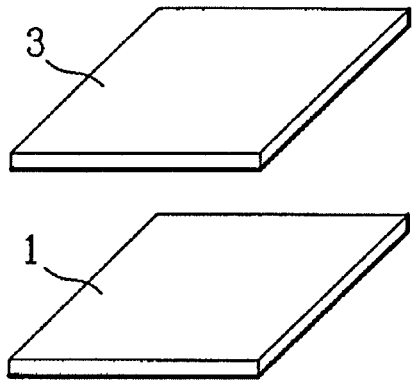
FIG. 1A Related Art
FIGS. 1A to 1D are perspective views illustrating a method of manufacturing an LCD device according to a related art liquid crystal application method.
Figure 1B:
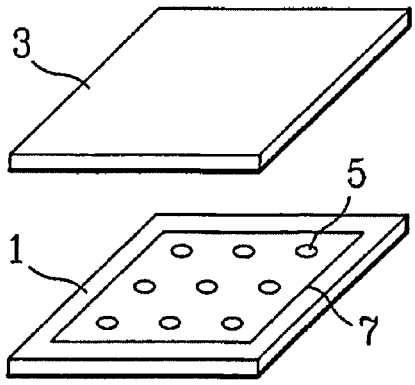
FIG. 1B Related Art
Figure 1C:
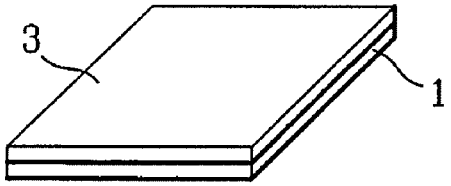
FIG. 1C Related Art
Figure 1D:
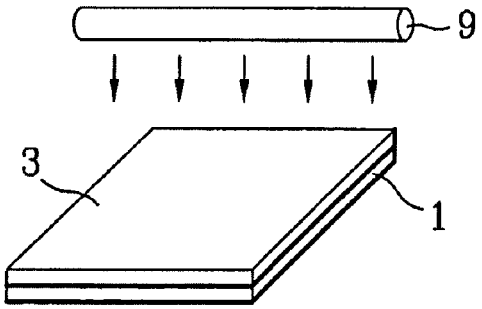
FIG. 1D Related Art
Figure 2A:
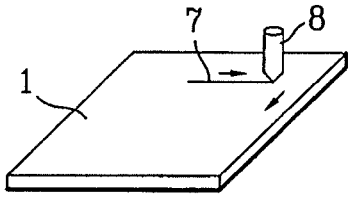
FIG. 2A Related Art
FIGS. 2A and 2B are perspective views illustrating a process of forming a UV sealant using a related art dispensing method.
Figure 2B:
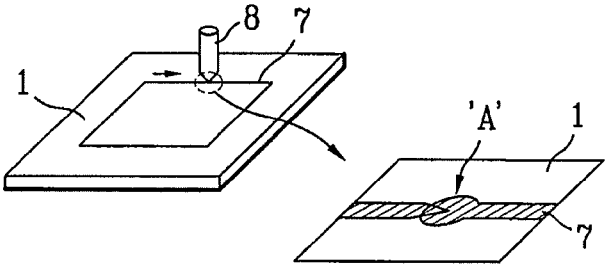
FIG. 2B Related Art
Figure 2C:
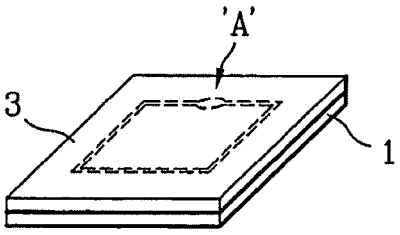
FIG. 2C Related Art
FIG. 2C is a perspective view illustrating a sealant formed by a related art dispensing method after attaching substrates to each other.
Figure 3A:
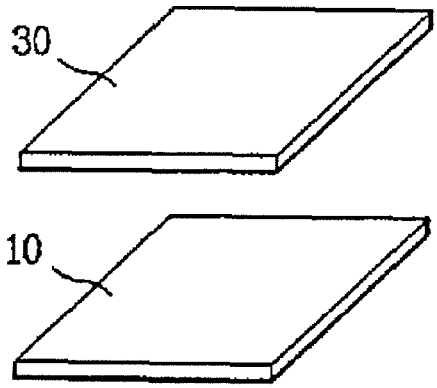
FIGS. 3A to 3D are perspective views illustrating a method of manufacturing an LCD device according to a first embodiment of the present invention.

As shown in FIG. 3A, a lower substrate 10 and an upper substrate 30 are prepared for the process. A plurality of gate and data lines (not shown) are formed on the lower substrate 10. The gate lines cross the data lines to define a pixel region. A thin film transistor (not shown) having a gate electrode, a gate insulating layer, a semiconductor layer, an ohmic contact layer, source/drain electrodes, and a protection layer is formed at each crossing point of the gate lines and the data lines. A pixel electrode (not shown) connected with the thin film transistor is formed in the pixel region.

An alignment film (not shown) is formed on the pixel electrode to initially align the molecules of liquid crystal. The alignment film may be formed of polyamide or polyimide based compound, polyvinylalcohol (PVA), and polyamic acid by rubbing. Alternatively, the alignment film may be formed of a photosensitive material, such as polyvinylcinnamate (PVCN), polysilioxanecinnamate (PSCN) or cellulosecinnamate (CelCN) based compound, by using a photo-alignment method.

A light-shielding layer (not shown) is formed on the upper substrate 30 to shield light leakage from the gate lines, the data lines, and the thin film transistor regions. A color filter layer (not shown) of R, G, and B is formed on the light-shielding layer. A common electrode (not shown) is formed on the color filter layer. Additionally, an overcoat layer (not shown) may be formed between the color filter layer and the common electrode. The alignment film is formed on the common electrode.

Silver (Ag) dots are formed outside the lower substrate 10 to apply a voltage to the common electrode on the upper substrate 30 after the lower and upper substrates 10 and 30 are attached to each other. Alternatively, the silver dots may be formed on the upper substrate 30.

For an in plane switching (IPS) mode LCD, the common electrode is formed on the lower substrate like the pixel electrode, and so that an electric field can be horizontally induced between the common electrode and the pixel electrode. The silver dots are not formed on the substrate.

Figure 3B:
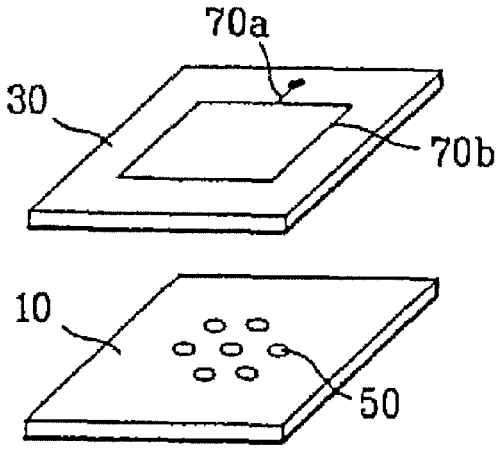

As shown in FIG. 3B, a liquid crystal 50 is applied onto the lower substrate 10 to form a liquid crystal layer.

An auxiliary UV curable sealant 70a is formed in a dummy area at a corner region of the upper substrate 30, subsequently, a main UV curable sealant 70b having no injection hole is formed, using a dispensing method.

The auxiliary UV sealant 70a is prevents any problem that may occur due to a sealant concentrated upon the end of a nozzle of a dispensing device. Therefore, it does not matter where the auxiliary UV sealant 70a is formed in the dummy area of the substrate, i.e., any blob of-sealant will be formed away from the active region of the liquid crystal display device and away from a region where the liquid crystal panel will be cut away from the mother substrate assembly. Formation of the main UV sealant 70b is preceded by the formation of the auxiliary UV sealant 70a. The auxiliary UV sealant 70a may be formed in a straight line as shown. Alternatively, the auxiliary UV sealant 70a may be formed in a curved line or other shape as long as it is formed in a dummy region.

Monomers or oligomers each having both ends coupled to the acrylic group, mixed with an initiator are used as the UV sealants 70a and 70b. Alternatively, monomers or oligomers each having one end coupled to the acrylic group and the other end coupled to the epoxy group, mixed with an initiator are used as the UV sealants 70a and 70b.

Also, the liquid crystal 50 may be contaminated if it comes into contact with the main UV sealant 70b before the main UV sealant 70b is hardened. Accordingly, the liquid crystal 50 may preferably be applied on the central part of the lower substrate 10. In this case, the liquid crystal 50 is gradually spread even after the main UV sealant 70b is hardened. Thus, the liquid crystal 50 is uniformly distributed on the substrate.

The liquid crystal 50 may be formed on the upper substrate 30 while the UV sealants 70a and 70b may be formed on the lower substrate 10. Alternatively, the liquid crystal 50 and the UV sealants 70a and 70b may be formed on one substrate. In this case, there is an imbalance between the processing times of the substrate with the liquid crystal and the sealants and the substrate without the liquid crystal and the sealants in the manufacturing process. For this reason, the total manufacturing process time increases. Also, when the liquid crystal and the sealants are formed on one substrate, the substrate may not be cleaned even if the sealant contaminates the panel before the substrates are attached to each other.

Accordingly, a cleaning process for cleaning the upper substrate 30 may additionally be provided before the attaching process after the UV sealants 70a and 70b are formed on the upper substrate 30.

Meanwhile, spacers may be formed on either of the two substrates 10 and 30 to maintain a cell gap. Preferably, the spacers may be formed on the upper substrate 30.

Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to the gate lines or data lines. Preferably, column spacers may be used for the large sized substrate since the ball spacers may cause an uneven cell gap for the large sized substrate. The column spacers may be formed of a photosensitive organic resin.

Figure 3C:
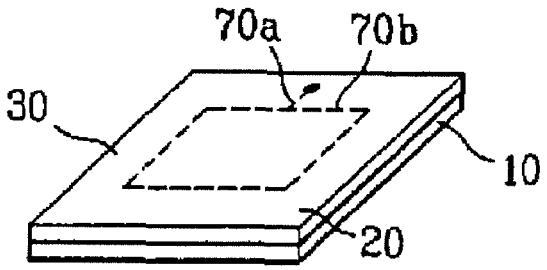

As shown in FIG. 3C, the lower substrate 10 and the upper substrate 30 are attached to each other by the following processes. First, one of the substrates having the liquid crystal dropped thereon is placed at the lower side. The other substrate is placed at the upper side by turning by 180 degrees so that its portion having layers faces into the substrate at the lower side. Thereafter, the substrate at the upper side is pressed, so that both substrates are attached to each other. Alternatively, the space between the substrates may be maintained under the vacuum state so that both substrates are attached to each other by releasing the vacuum state.

Figure 3D:
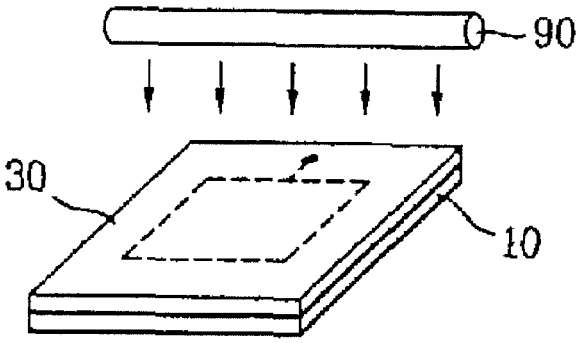

Then, as shown in FIG. 3D, UV light is irradiated upon the attached substrates through a UV irradiating device 90.

Upon irradiating the UV light, monomers or oligomers activated by an initiator constituting the UV sealants are polymerized and hardened, thereby bonding the lower substrate 10 to the upper substrate 30.

If monomers or oligomers each having one end coupled to the acrylic group and the other end coupled to the epoxy group, mixed with an initiator are used as the UV sealants, the epoxy group is not completely polymerized by the application of UV light. Therefore, the sealants may have to be additionally heated at about 120° C. for one hour after the UV irradiation, thereby hardening the sealants completely.

Afterwards, although not shown, the bonded substrates are cut into a unit cells and final test processes are performed.

In the cutting process, a scribing process is performed by forming a cutting line on surfaces of the substrates with a pen or wheel of a material having hardness greater than that of glass, such as diamond, and then the substrates are cut along the cutting line by mechanical impact (breaking process). Alternatively, the scribing process and the breaking process may simultaneously be performed using a pen or wheel of a diamond or other hard material.

The cutting line of the cutting process is formed between the start point of the auxiliary sealant, which may be a blob A of sealant, and a main UV sealant across the initially formed auxiliary UV sealant 70a. Consequently, a substantial portion of the excessively distributed auxiliary UV sealant 70a is removed.

FIGS. 4A to 4D are perspective views illustrating a process of irradiating UV light in the method of manufacturing an LCD device according to the second embodiment of the present invention. The second embodiment is similar to the first embodiment except for the UV irradiation process. In the second embodiment, a region where the sealants are not formed is covered with a mask before the UV light is irradiated. Since the other elements of the second embodiment are the same as those of the first embodiment, the same reference numerals will be given to the same elements and their detailed description will be omitted.

If the UV light is irradiated upon the entire surface of the attached substrates, the UV light may deteriorate characteristics of devices such as a thin film transistor on the substrate and may change a pre-tilt angle of an alignment film formed for the initial alignment of the liquid crystal.

Therefore, in the second embodiment of the present invention, the UV light is irradiated when the area where no sealant is formed is covered with a mask.

Figure 4A:
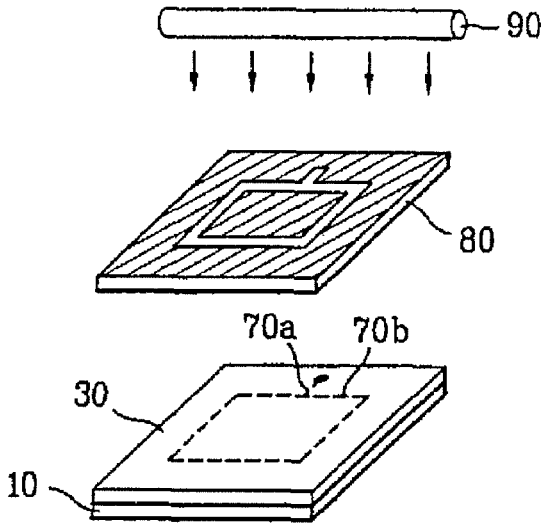
FIGS. 4A to 4D are perspective views illustrating a process of forming a UV sealant in manufacturing an LCD device according to a second embodiment of the present invention of the present invention.

Referring to FIG. 4A, a region where the auxiliary UV sealant 70a and the main UV sealant 70b are formed is covered with a mask 80. The mask 80 is placed at an upper side of the attached substrates, and the UV light is irradiated.

Also, the mask 80 may be placed at a lower side of the attached substrates. Also, although the UV light is irradiated upon the upper substrate 30 of the attached substrates as shown, the UV light may be irradiated upon the lower substrate 10 by turning the attached substrates.

If the UV light from a UV irradiating device 90 is reflected and irradiated upon an opposite side, it may deteriorate characteristics of devices, such as the thin film transistor on the substrate and the alignment film, as described above. Therefore, masks are preferably formed at lower and upper sides of the attached substrates.

Figure 4B:
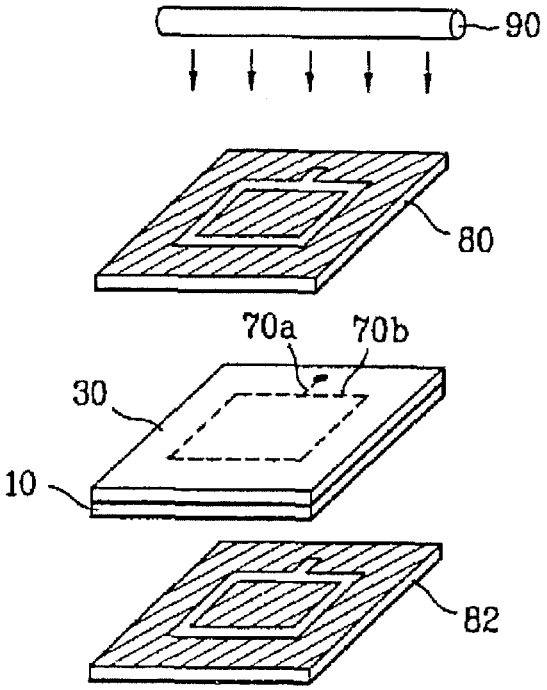

That is, as shown in FIG. 4B, masks 80 and 82 that cover the region where the sealants 70a and 70b are not formed are placed are at upper and lower sides of the attached substrates. The UV light is then irradiated thereupon.

Meanwhile, since the auxiliary UV sealant 70a does not act as a sealant, it does not require hardening. Also, since the region of the auxiliary UV sealant 70a overlaps the cell cutting line during the later cell cutting process, it is more desirable for the cell cutting process that the auxiliary UV sealant 70 is not hardened.

Figure 4C:
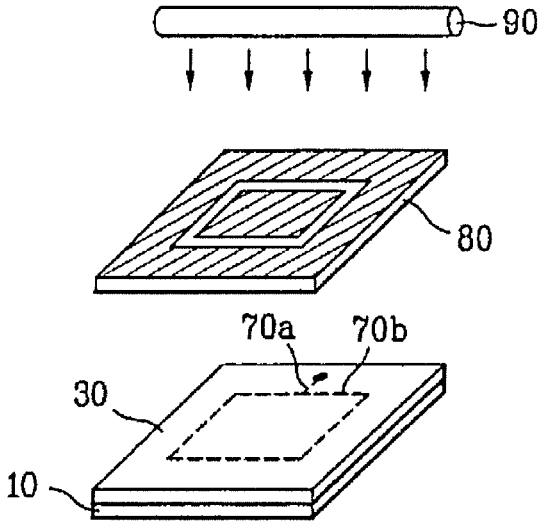
Figure 4D:
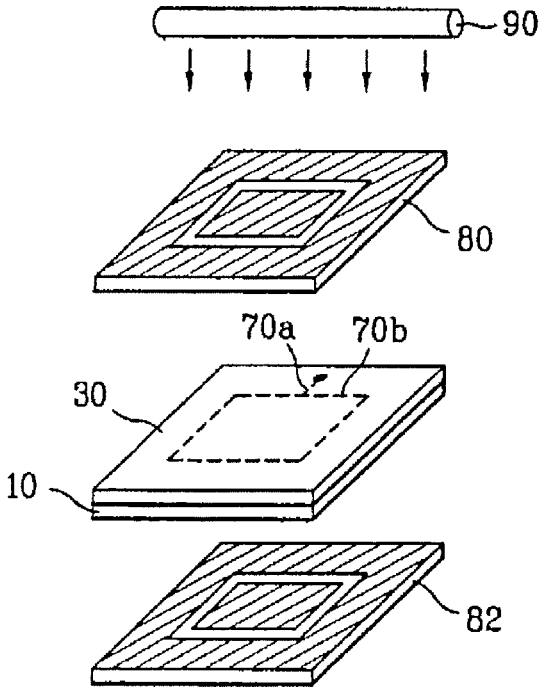

Referring to FIGS. 4C and 4D, the auxiliary UV sealant 70a is not hardened by irradiating the UV light when only the area where the main UV sealant 70b is not formed is covered with the mask, i.e., the auxiliary sealant 70a is also covered by a mask.

In this case, in FIG. 4C, the UV light is irradiated with the mask 80 in place at a lower or upper side of the attached substrates. In FIG. 4D, the UV light is irradiated when the mask 80 is respectively placed at lower and upper sides of the attached substrates.

Figure 5A:
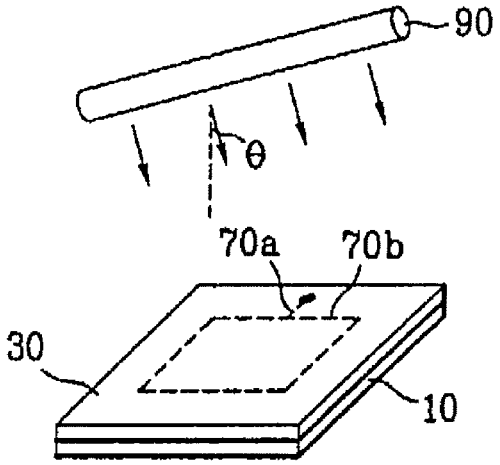
FIGS. 5A and 5B are perspective views illustrating a process of forming a UV sealant in a method of manufacturing an LCD device according to a third embodiment of the present invention of the present invention.
Figure 5B:
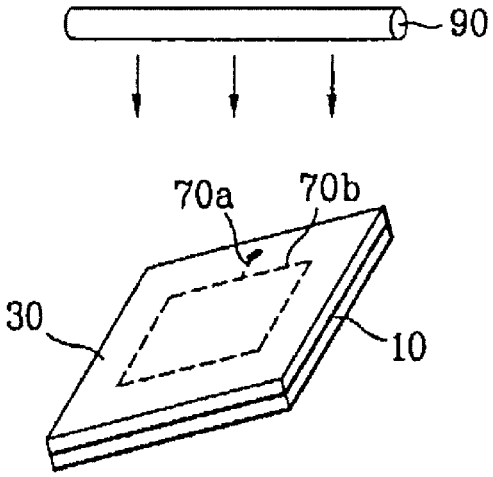

FIGS. 5A and 5B are perspective views illustrating a process of forming a UV sealant in a method of manufacturing an LCD device according to the third embodiment of the present invention of the present invention.

The third embodiment is identical to the second embodiment except for the UV irradiation process. In the third embodiment, the UV light is irradiated at a tilt angle. Since the other elements of the third embodiment are identical to those of the second embodiment, the same reference numerals will be given to the same elements and their detailed description will be omitted.

If a light-shielding layer and a metal line such as gate and data lines are formed on a region where the UV sealant is formed, the UV light is not irradiated upon the region, thereby failing to harden the sealant. For this reason, adherence between the lower and upper substrates is reduced.

Therefore, in the third embodiment of the present invention, the UV light is irradiated at a tilt angle upon the substrate where the UV sealant is formed, so that the UV sealant is hardened even if the light-shielding layer or the metal line layer is formed between the UV irradiating surface and the sealant.

To irradiate the UV light at a tilt angle, as shown in FIG. 5A, the attached substrates are horizontally arranged and a UV irradiating device 90 is arranged at a tilt angle of θ. Alternatively, as shown in FIG. 5B, the attached substrates may be arranged at a tilt angle and the UV irradiating device 90 may horizontally be arranged.

Also, the UV light may be irradiated at a tilt angle when the area where the sealant is not formed is covered with the mask as shown in FIGS. 4A to 4D.

Figure 6:
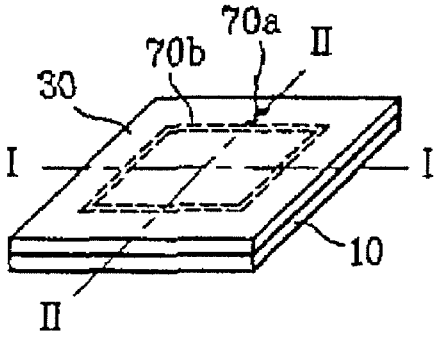
FIG. 6 is a perspective view illustrating an LCD device according to a fourth embodiment of the present invention.
Figure 7A:
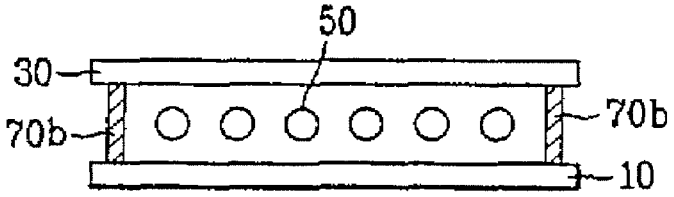
FIGS. 7A and 7B are sectional views taken along lines I-I and II-II of FIG. 6.
Figure 7B:
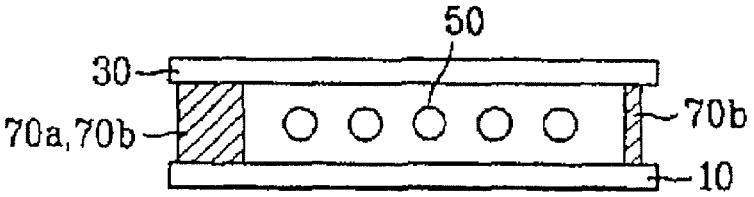

FIG. 6 is a perspective view illustrating an LCD device according to the fourth embodiment of the present invention, and FIGS. 7A and 7B are sectional views taken along lines I-I and II-II of FIG. 6.

As shown in FIGS. 6 and 7, an LCD device according to the present invention includes lower and upper substrates 10 and 30, a UV sealant between the lower and upper substrates 10 and 30, having an auxiliary UV sealant 70a in a dummy area and a perimeter of main UV sealant 70b connected to the auxiliary UV sealant 70a, and a liquid crystal layer 50 between the lower and upper substrates 10 and 30.

At this time, although not shown, a thin film transistor, a pixel electrode, and an alignment film are formed on the lower substrate 10. A black matrix layer (not shown), a color filter layer (not shown), a common electrode (not shown) and an alignment film (not shown) are formed on the upper substrate 30. Also, spacers are formed between the lower and upper substrates 10 and 30 to maintain a cell gap between the substrates.

As aforementioned, the LCD device and the method of manufacturing the same according to the present invention have the following advantages.

Since the sealant concentrated upon the end of the nozzle of the dispensing device is formed in the dummy area on the substrate, the liquid crystal layer is not contaminated by the attaching process of the substrates and the cell cutting process is easily performed.

Furthermore, if the UV light is irradiated upon the substrate when the mask is formed at the lower and/or upper side of the attached substrates, the UV light is irradiated upon only the region where the UV sealant is formed. In this case, the alignment film formed on the substrate is not damaged and the characteristics of the devices, such as the thin film transistor, are not deteriorated.

Finally, if the UV light is irradiated at a tilt angle, the sealant can be hardened even if the light-shielding layer or the metal line is formed on the sealant, thereby avoiding reducing adherence between the lower and upper substrates.

It will be apparent to those skilled in the art that various modifications and variations can be made in the present invention. Thus, it is intended that the present invention covers the modifications and variations of this invention provided they come within the scope of the appended claims and their equivalents.

What is claimed is:

[~~1. A method of manufacturing a liquid crystal display (LCD) device comprising:~~

~~preparing a lower substrate and an upper substrate;~~

~~forming an auxiliary sealant and subsequently forming a main sealant on one of the lower and upper substrates, wherein the auxiliary sealant is formed in a dummy region and connects to the main sealant, and wherein the auxiliary sealant and the main sealant are contiguous;~~

~~applying a liquid crystal on one of the lower and upper substrates;~~

~~attaching the lower and upper substrates; and~~

~~curing at least the main sealant.~~]

[~~2. The method of claim 1, wherein the main sealant and the auxiliary sealant are at least partially curable by irradiating UV light and curing the main sealant includes irradiating UV light.~~]

3. The method of claim [2] *31*, wherein *curing the main sealant includes irradiating UV light, and* the sealant is formed using oligomers each having both ends coupled to an acrylic group.

4. The method of claim [2] *31*, wherein *curing the main sealant includes irradiating UV light, and* the sealant is formed using monomers each having both ends coupled to an acrylic group.

[5. ~~The method of claim 2, wherein the sealant is formed using oligomers each having one end coupled to an acrylic group and the other end coupled to an epoxy group.~~]

[6. ~~The method of claim 5, further comprising heating the sealant after irradiating the UV light.~~]

7. The method of claim [2] *31*, wherein *curing the main sealant includes irradiating UV light, and* the sealant is formed using monomers each having one end coupled to an acrylic group and the other end coupled to an epoxy group.

8. The method of claim 7, further comprising heating the sealant after irradiating the UV light.

[9. ~~The method of claim 2, further comprising heating the sealant after irradiating the UV light.~~]

10. The method of claim [2] *31*, wherein *curing the main sealant includes irradiating UV light, and* a region where the sealant is not formed is covered with a mask during the irradiating with UV light.

[11. ~~The method of claim 2, wherein a region where the main UV sealant is not formed is covered with a mask during the irradiating with UV light.~~]

12. The method of claim [2] *31*, wherein *curing the main sealant includes irradiating UV light, and* the UV light is irradiated at a tilt angle with respect to the attached substrates.

13. The method of claim [2] *31*, *wherein curing the main sealant includes irradiating UV light, the method* further comprising:

providing a mask over a region where the main sealant is not formed before irradiating UV light such that the auxiliary sealant is not exposed to the UV light; and cutting the attached substrates.

14. The method of claim [1] *31*, further comprising forming column spacers on the upper substrate.

15. The method of claim [1] *31*, wherein the main and auxiliary sealants are formed on the upper substrate and the liquid crystal is applied to the lower substrate.

[16. ~~The method of claim 1, further comprising cutting the attached substrates.~~]

[17. ~~The method of claim 16, wherein the attached substrates are cut across a portion of the auxiliary sealant.~~]

18. The method of claim [1] *31*, wherein the applying the liquid crystal includes dropping the liquid crystal onto the one of the upper and lower substrates.

19. The method of claim 18, wherein the liquid crystal is applied in a predetermined pattern onto the one of the upper and lower substrates.

[20. ~~The method of claim 1, wherein the auxiliary sealant contacts the main sealant.~~]

[21. ~~A method of manufacturing a liquid crystal display (LCD) device comprising:~~

~~preparing a lower substrate and an upper substrate;~~

~~forming an auxiliary UV sealant and a main UV sealant on one of the lower and upper substrates, wherein the auxiliary UV sealant is formed in a dummy region and extends outside from the main UV sealant, wherein the auxiliary UV sealant contacts the main UV sealant;~~

~~applying a liquid crystal on one of the lower and upper substrates;~~

~~attaching the lower and upper substrates; and~~

~~irradiating UV light on the attached substrates.~~]

22. The method of claim [21] *23*, wherein the UV light is irradiated at a tilt angle with respect to the attached substrates.

*23. A method of manufacturing a liquid crystal display (LCD) device comprising:*

*preparing a lower substrate and an upper substrate;*

*forming an auxiliary UV sealant and a main UV sealant on one of the lower and upper substrates, wherein:*

*the main UV sealant has no injection hole;*

*the auxiliary UV sealant is formed in a dummy region and extends outside from the main UV sealant;*

*the auxiliary UV sealant includes a sealant blob at a sealant deposition starting point; and*

*the auxiliary UV sealant contacts the main UV sealant;*

*applying a liquid crystal on one of the lower and upper substrates;*

*attaching the lower and upper substrates; and*

*irradiating UV light on the attached substrates.*

*24. The method of claim 23, wherein the sealant blob is deposited completely outside of an area enclosed by the main UV sealant.*

*25. The method of claim 23, wherein the auxiliary UV sealant contacts the main UV sealant at a substantially 90-degree angle.*

*26. The method of claim 23, wherein the auxiliary UV sealant forms a substantially straight line between the sealant blob and the main UV sealant.*

*27. The method of claim 23, wherein the auxiliary UV sealant forms a curve between the sealant blob and the main UV sealant.*

*28. The method of claim 23, further comprising cutting the attached substrates across a portion of the auxiliary UV sealant between the sealant blob and the main UV sealant.*

*29. The method of claim 23, wherein the main UV sealant defines a completely enclosed active region on one of the lower and upper substrates.*

*30. The method of claim 23, wherein the auxiliary UV sealant is not connected to an injection hole.*

*31. A method of manufacturing a liquid crystal display (LCD) device comprising:*

*preparing a lower substrate and an upper substrate;*

*forming an auxiliary sealant that is at least partially curable by ultraviolet light and subsequently forming a main sealant that is at least partially curable by ultraviolet light on one of the lower and upper substrates, wherein:*

*the main sealant has no injection hole;*

*the auxiliary sealant is formed in a dummy region and connects to the main sealant;*

*the auxiliary sealant includes a sealant blob at a sealant deposition starting point; and*

*the auxiliary sealant and the main sealant are contiguous;*

*applying a liquid crystal on one of the lower and upper substrates;*

*attaching the lower and upper substrates; and*

*curing at least the main sealant.*

*32. The method of claim 31, wherein the sealant blob is deposited completely outside of an area enclosed by the main sealant.*

*33. The method of claim 31, wherein the auxiliary sealant connects to the main sealant at a substantially 90-degree angle.*

*34. The method of claim 31, wherein the auxiliary sealant forms a substantially straight line between the sealant blob and the main sealant.*

*35. The method of claim 31, wherein the auxiliary sealant forms a curve between the sealant blob and the main sealant.*

*36. The method of claim 31, further comprising cutting the attached substrates across a portion of the auxiliary sealant between the sealant blob and the main sealant.*

*37. The method of claim 31, wherein the main sealant defines a completely enclosed active region on one of the lower and upper substrates.*

*38. The method of claim 31, wherein the auxiliary sealant is not connected to an injection hole.*

* * * * *